United States Patent
Wan et al.

(10) Patent No.: US 9,491,241 B1
(45) Date of Patent: Nov. 8, 2016

(54) DATA STORAGE SYSTEM WITH NATIVE REPRESENTATIONAL STATE TRANSFER-BASED APPLICATION PROGRAMMING INTERFACE

(71) Applicant: EMC Corporation, Hopkinton, MA (US)

(72) Inventors: Lintao Wan, Shanghai (CN); Smitha Mave, Bangalore (IN); Steven Chen, Shanghai (CN); Xi Chen, Shanghai (CN); Ziye Yang, Shanghai (CN); Chenhui Fan, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 108 days.

(21) Appl. No.: 14/319,249

(22) Filed: Jun. 30, 2014

(51) Int. Cl.
*G06F 15/16* (2006.01)
*H04L 29/08* (2006.01)
*G06F 17/30* (2006.01)

(52) U.S. Cl.
CPC ......... *H04L 67/1097* (2013.01); *G06F 17/302* (2013.01); *H04L 67/06* (2013.01)

(58) Field of Classification Search
None
See application file for complete search history.

(56) References Cited

U.S. PATENT DOCUMENTS

| | | | | |
|---|---|---|---|---|
| 9,049,182 | B2 * | 6/2015 | Burch | H04L 63/08 |
| 9,380,103 | B2 * | 6/2016 | Thaker | H04L 67/00 |
| 2011/0106771 | A1 * | 5/2011 | McDonald | G06F 17/30194 |
| | | | | 707/663 |
| 2011/0106802 | A1 * | 5/2011 | Pinkney | G06F 17/30085 |
| | | | | 707/737 |
| 2011/0161297 | A1 * | 6/2011 | Parab | G06F 11/1453 |
| | | | | 707/646 |
| 2012/0102080 | A1 * | 4/2012 | Kirihata | G06F 21/604 |
| | | | | 707/831 |
| 2013/0204849 | A1 * | 8/2013 | Chacko | G06F 3/0604 |
| | | | | 707/692 |
| 2014/0325260 | A1 * | 10/2014 | Gladwin | G06F 11/203 |
| | | | | 714/6.13 |
| 2015/0160872 | A1 * | 6/2015 | Chen | G06F 3/0619 |
| | | | | 711/114 |

OTHER PUBLICATIONS

P. Mell et al., "The NIST Definition of Cloud Computing," National Institute of Standards and Technology, Special Publication 800-145, Sep. 2011, 7 pages.

"Isilon OneFS Operating System, Powering Scale-Out Storage for the New World of Big Data in the Enterprise," webpage including data sheet, http://www.emc.corn/storage/isilon/isilon-onefs-operating-system.htm, Jun. 2014, 7 pages.

* cited by examiner

*Primary Examiner* — Thomas Dailey
(74) *Attorney, Agent, or Firm* — Ryan, Mason & Lewis, LLP

(57) ABSTRACT

A data storage system includes: one or more storage nodes configured to attach to a computer network to provide network-attached storage for the computer network; a first application programming interface providing data storage functionality at a file level in the one or more network-attached storage nodes for a first set of application programs operating in the computer network; and a second application programming interface providing data storage functionality at a level other than the file level in the one or more network-attached storage nodes for a second set of application programs operating in the computer network, wherein the second application programming interface comprises one or more native representational state transfer-based application programming interfaces.

20 Claims, 3 Drawing Sheets

DATA STORAGE SYSTEM WITH NATIVE REPRESENTATIONAL STATE TRANSFER-BASED APPLICATION PROGRAMMING INTERFACE

FIELD

The field relates to data storage and, more particularly, to data storage utilizing a native representational state transfer (REST) based application programming interface (API).

BACKGROUND

Network-attached storage (NAS) is file-level data storage connected to a computer network providing data storage functionality to clients operating in the computer network, e.g., application programs (applications) executing on network devices. NAS operates as a file server and, in particular, is specialized for the task of file serving either by its hardware, software, and/or configuration of these elements. A NAS data storage system typically includes one or more networked appliances which contain one or more hard drives. These hard drives are often arranged into logical, redundant storage containers or a redundant array of independent disks (RAID). NAS removes the responsibility of file serving from other servers on the computer network, and typically provides client access to files using a standardized storage networking protocol such as, for example, Network File System (NFS) or Common Internet File System (CIFS). One example of an NAS data storage system is Isilon®, commercially available from EMC Corporation (Hopkinton, Mass.).

SUMMARY

Embodiments of the invention provide data storage utilizing a native representational state transfer-based application programming interface.

For example, in one embodiment, a data storage system comprises one or more storage nodes configured to attach to a computer network to provide network-attached storage for the computer network. The data storage system also comprises a first application programming interface providing data storage functionality at a file level in the one or more network-attached storage nodes for a first set of application programs operating in the computer network. The data storage system also comprises a second application programming interface providing data storage functionality at a level other than the file level in the one or more network-attached storage nodes for a second set of application programs operating in the computer network, wherein the second application programming interface comprises one or more native representational state transfer-based application programming interfaces.

Advantageously, data storage techniques according to embodiments of the invention enable user customization of data storage systems and expansion of data storage functionalities through the use of one or more native REST-based APIs.

These and other features and advantages of the invention will become more readily apparent from the accompanying drawings and the following detailed description.

DETAILED DESCRIPTION

Figure 1:
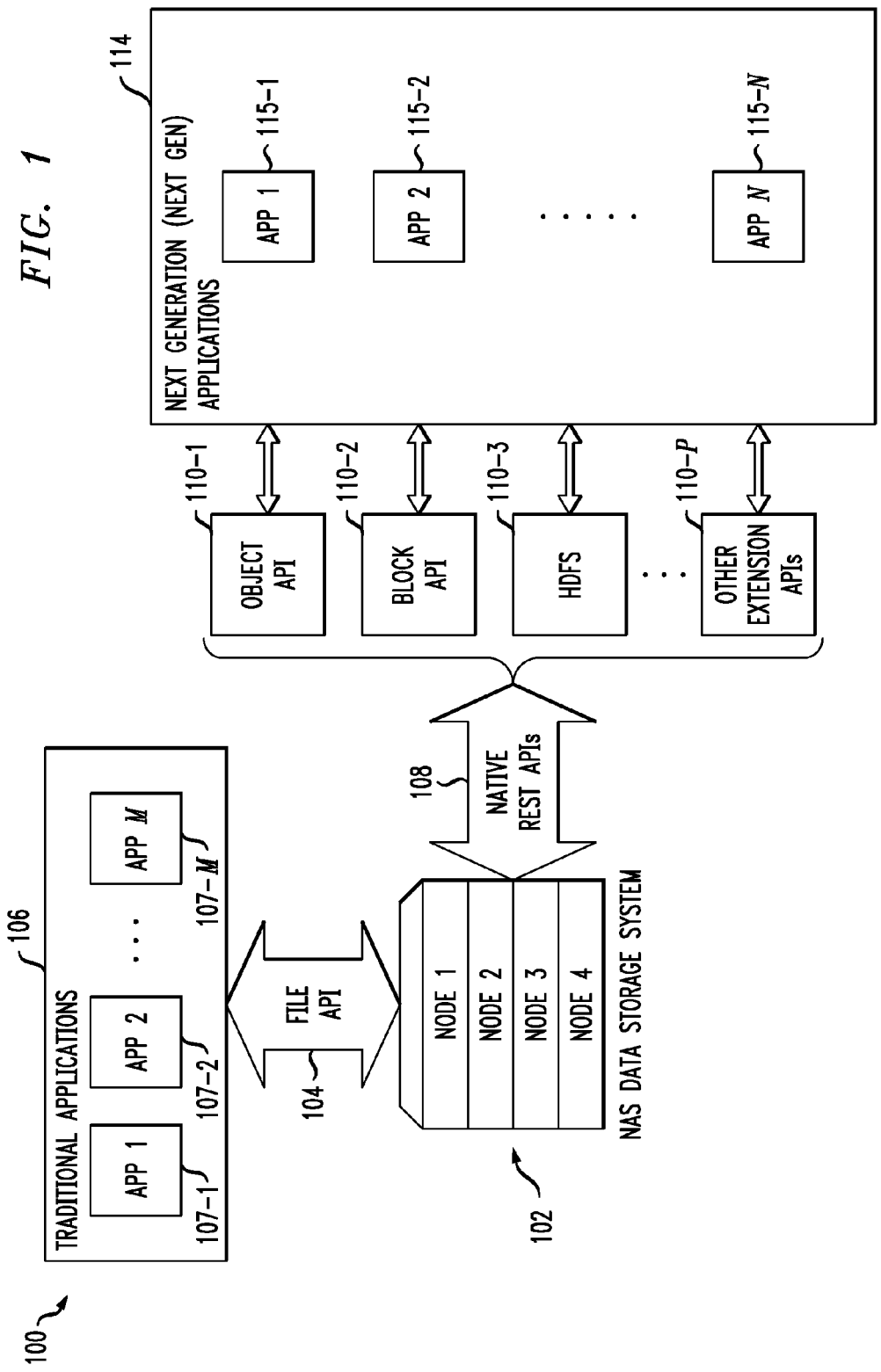
FIG. 1 illustrates a network attached storage-based data storage system environment utilizing a native representational state transfer-based application programming interface according to an embodiment of the invention.

Illustrative embodiments of the invention will be described herein with reference to exemplary computing systems and data storage systems, as well as associated servers, computers, storage units, computing devices, and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

As used herein, the term "cloud" refers to a collective computing infrastructure that implements a cloud computing paradigm. For example, as per the National Institute of Standards and Technology (NIST Special Publication No. 800-145), cloud computing may be considered a model for enabling ubiquitous, convenient, on-demand network access to a shared pool of configurable computing resources (e.g., networks, servers, storage, applications, and services) that can be rapidly provisioned and released with minimal management effort or service provider interaction.

As used herein, the term "application" refers to one or more software programs designed to perform one or more functions.

As used herein, the phrase "application programming interface" (API) refers to a set of instructions or routines that accomplish a specific task such as allowing one entity (e.g., system, component, device) to interact with another entity.

As mentioned above, an example of an NAS data storage system is Isilon®, commercially available from EMC Corporation (Hopkinton, Mass.). The Isilon® NAS system provides file-level data storage functionality through use of an NFS protocol, as well as simple block-level data access through use of an Internet Small Computer System Interface (iSCSI) protocol. More particularly, the Isilon® NAS system provides a clustered storage system architecture comprising a cluster of independent nodes (e.g., disk drives) that are integrated via an operating system known as OneFS®. The nodes can be installed in data center environments and are accessible to users and applications running Windows®, Unix/Linux® and Mac® operating systems using file sharing protocols (e.g., NFS and CIFS) over standard Gigabit or 10-Gigabit Ethernet. Nodes within the clustered storage system communicate with each other over a dedicated Infiniband local area network. The architecture is designed so that each node has full visibility and write/read access to or from a single expandable file system. The OneFS® software is designed with file-striping functionality across each node in the cluster, a fully distributed lock manager, caching, fully distributed meta-data, and a remote block manager to maintain global coherency and synchronization across the cluster. The Isilon® NAS system with its OneFS® operating system provides a scale-out architecture that can grow by adding storage nodes in a single cluster as desired for capacity and/or performance.

However, embodiments of the invention realize that some users of the Isilon® NAS system may need more types of access APIs in order to meet requirements for special or custom applications or performance requirements (e.g., quality-of-service or QoS). Particularly when considering cloud environments, big data use cases, and today's popular mobile applications (e.g., Next Generation or NexGen applications), it would be desirable for an NAS system such as Isilon® to provide additional interfaces for data access. It is not practical, however, to extend such an NAS system to support all types of data access APIs. As such, embodiments of the invention provide a method and architecture for NAS system functionality extension, further development and integration. More particularly, embodiments of the invention provide a set of one or more low-level native representational state transfer (REST) based APIs, which exports basic functionalities for data access and system management, thereby allowing users to develop any type of APIs on their own to satisfy their special or custom application requirements. Furthermore, users are enabled to tune the NAS system based on the native APIs, so that the system can provide more user-defined or user-customized features, for example, user-specific QoS, access control, etc. Users can also tune the NAS system's internal parameters for performance purposes on their own.

As is known, REST is a mechanism used to create, read, update or delete data on a computer system using simple HyperText Transfer Protocol (HTTP) calls. REST is an alternative to more complex mechanisms such as Simple Object Access Protocol (SOAP), Common Object Request Broker Architecture (CORBA), and Remote Procedure Call (RPC). A REST call is typically an HTTP request to the computer system. More particularly, REST is a software architectural style comprising, for example, a coordinated set of architectural constraints applied to components, connectors, and data elements, within a distributed hypermedia system. REST typically ignores the details of component implementation and protocol syntax in order to focus on the roles of components, the constraints upon their interaction with other components, and their interpretation of significant data elements.

FIG. 1 illustrates a network attached storage-based data storage system environment 100 utilizing a native REST-based application programming interface according to an embodiment of the invention. While the NAS system depicted in FIG. 1 may be the Isilon® NAS system in one embodiment, alternative embodiments are not so limited. Thus, as shown, NAS data storage system 102 comprises a plurality of storage nodes (e.g., node1, node2, node3, node4) which may be disk drives of an Isilon® system in one embodiment. The storage nodes may represent a storage cluster. The storage nodes are accessible via a file-level API 104 by a set of traditional application programs 106 (App1 107-1, App2 107-2, . . . , AppM 107-M). Examples of traditional applications include, but are not limited to, appli- cations available from Oracle®, SAP®, Microsoft Dynamics®, Java®, etc. Such traditional applications are, by way of example only, web applications that comprise a presentation tier, a business logic tier, and a storage tier.

In addition, the storage nodes are accessible via native REST-based APIs 108 that provide data storage functionality at a level other than file-level. For example, as shown in FIG. 1, data storage functionality is available at an object-level through API 110-1, at a block level through API 110-2, at a Hadoop file system level through API 110-3, and at other user-extendable levels through APIs 110-P. These native REST-based APIs provide access to the storage nodes by a set of NextGen application programs 114 (App1 115-1, App2 115-2, . . . , AppN 115-N). Examples of NextGen (non-traditional) applications include, but are not limited to, mobile applications, cloud applications, big data applications, social applications, etc. By way of example only, such non-traditional applications may include OpenStack and Syncplicity.

Figure 2:
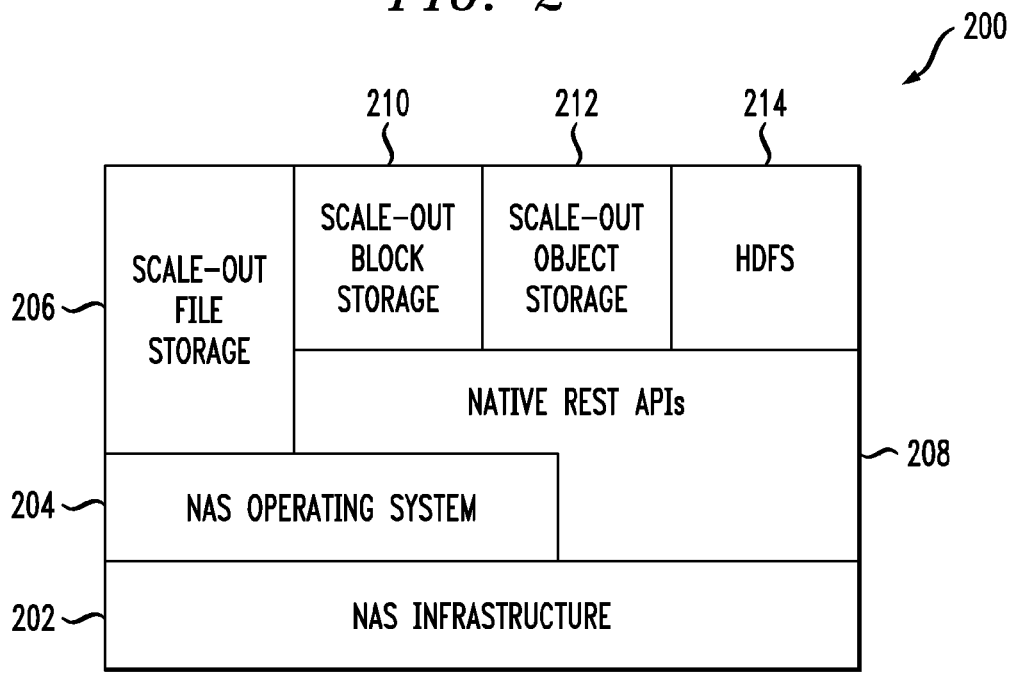
FIG. 2 illustrates a network attached storage-based architecture utilizing a native representational state transfer-based application programming interface according to an embodiment of the invention.

FIG. 2 illustrates a network attached storage-based architecture 200 utilizing a set of native REST-based APIs according to an embodiment of the invention. More particularly, FIG. 2 depicts an illustrative architecture which may be implemented by the NAS data storage system shown in FIG. 1. As shown, the architecture 200 comprises an NAS infrastructure 202, which may be the individual storage nodes and related underlying software shown in FIG. 1. Further, the architecture 200 comprises an NAS operating system 204. The NAS operating system 204, in the case of an Isilon® NAS infrastructure, may be OneFS®. The OneFS® operating system 204 combines the typical three layers of storage architecture (i.e., file system, volume manager, and data protection) into one unified software layer, creating a single intelligent distributed file system that runs on an Isilon® storage cluster.

Scale-out file storage 206 is based on the file APIs (104) of OneFS® and its scale-out design architecture. That is, the scale-out file storage 206 is the data storage functionality available to traditional applications through the file level API 104 (FIG. 1). The APIs 208 are the set of native APIs (108, 110-1, . . . , 110-P in FIG. 1) in REST style that provide basic functionalities for data access and system management for the NextGen applications. The functionalities can be divided into several categories, e.g., data manipulation (e.g., create/delete/read/write, etc.), data layout, cache management, system configuration, etc.

Scale-out block storage 210, scale-out object storage 212, and HDFS 214 are data storage functionalities available through the native REST APIs 208. Other types of data access APIs can be implemented with this extensible architecture. Take object storage as an example. The system enables wrapping of a set of object APIs (which can be Amazon® S3-compliant) to provide an object storage service and an object can be stored as a file on the Isilon® storage cluster via its built-in file APIs. Regardless of what type of data access APIs are desired, the system can take advantage of the scale-out design and architecture of Isilon®.

With the native REST-based APIs according to embodiments of the invention, an NAS system such as Isilon® can also be transformed to a building block for cloud infrastructure, as the native REST-based APIs allow development so as to integrate with other information technology (IT) systems and resources. For example, an NAS system with native REST-based APIs can be easily integrated into an OpenStack cloud environment, working as a backend storage for image repository, object storage and block storage.

The system may also be integrated with Amazon Web Services (AWS) and CloudStack, provide user-specific quality-of-service, file sharing as a service, performance tuning by customizing system configurations, and facilitate implementation of Hadoop as a service.

As mentioned above, in the existing Isilon® system, only file-based APIs and simple block-based APIs are supported, which may not sufficiently satisfy certain third party software/systems. That is, while Isilon® is designed to scale out well, it may not be easily integrated into cloud or big data environments. Embodiments of the invention provide solutions to these scenarios without the need to modify the existing Isilon® architecture. The approach is also straightforward to implement since the native REST-based APIs support basic functionalities, are standard compliant, enable further development and extension, and allow for discovery of more potential use cases for the Isilon® NAS system.

Figure 3:
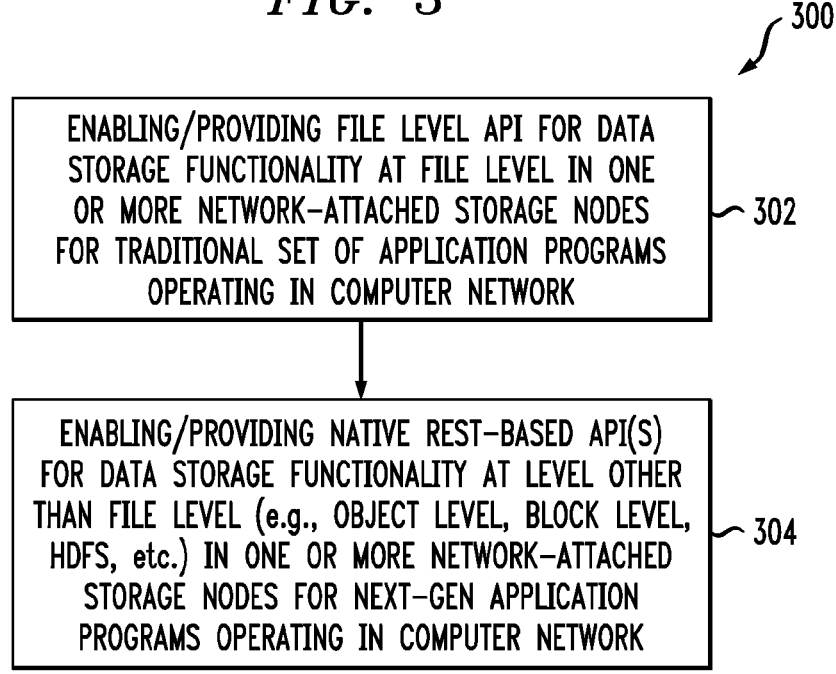
FIG. 3 illustrates a data storage methodology implementing a native representational state transfer-based application programming interface according to an embodiment of the invention.

For a native REST-based API, different HTTP methods may be used other than normal GET, POST. The methods also include, but are not limited to, HEAD, PUT, DELETE. In general, the GET method is usually used for listing and retrieval. The HEAD method has similar behavior to GET, but is used for limited information retrieval, and does not include object data. The DELETE method is used to remove objects, metadata, folders, etc. POST and PUT methods, in a practical design, are typically used to create/update objects, folders, versions, etc. For example, REST functions/interfaces may be put into the illustrative categories below:

Object operations
    Create an object
    Read an object
    Update an object
    Delete an object
    List objects
    Get object info/metadata
Folder operations
    Create a folder
    Delete a folder
    List objects in a given folder
Metadata operations
    Create user metadata
    Get user metadata
    Get system metadata
Access control operations
    Set an access control list (ACL) of a given object
    Set an ACL of a given folder
    Get an ACL
Version operations for a given object
    Create a version
    Delete a version
    Restore a version
    List versions
Service operations
    Get service information/status FIG. 3 illustrates a data storage methodology 300 implementing one or more native REST-based APIs according to an embodiment of the invention. In step 302, file level API(s) are enabled/provided for data storage functionality at file level in one or more network-attached storage nodes for a traditional set of application programs operating in a computer network. In step 304, native REST-based API(s) are enabled/provided for data storage functionality at one or more levels other than a file level (e.g., object level, block level, HDFS, etc.) in one or more network-attached storage nodes for NextGen application programs operating in the computer network. Applications and programs other than NextGen type applications can utilize the native REST-based APIs.

Figure 4:
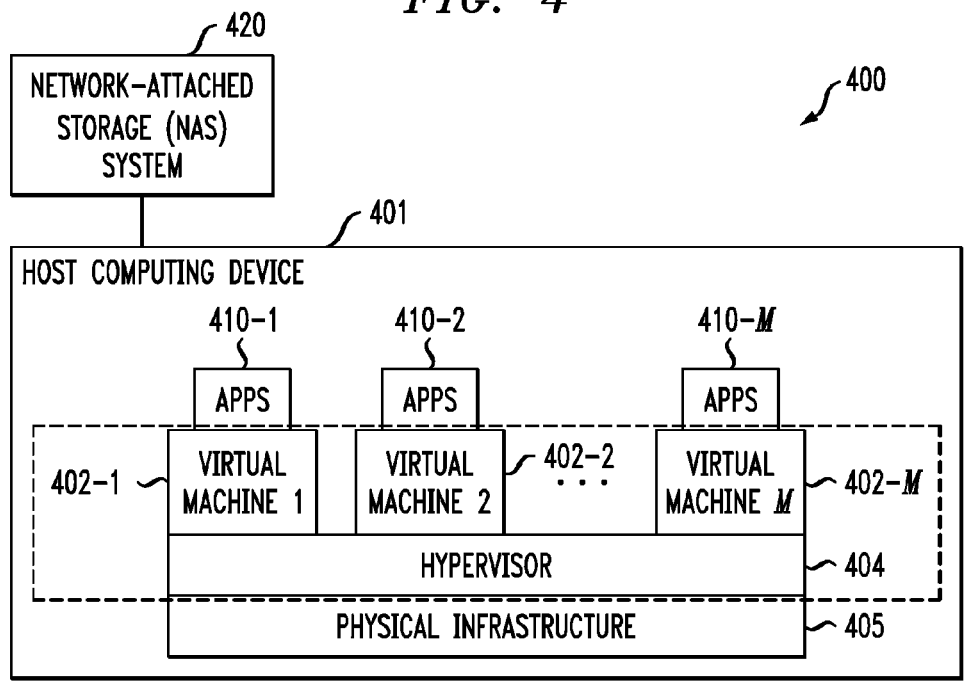
FIG. 4 illustrates a host computing device according to an embodiment of the invention.

FIG. 4 illustrates a host computing device environment 400 according to an embodiment of the invention. It is to be understood that while FIG. 4 shows a virtualized application environment, NAS storage techniques described herein may be used with applications installed directly on physical machines and/or mobile devices as well.

As shown in the illustrative embodiment of FIG. 4, the host infrastructure 401 comprises virtual machines (VMs) 402-1, 402-2, . . . 402-M implemented using a hypervisor 404. The hypervisor 404, as mentioned above, is an example of what is more generally referred to herein as "virtualization infrastructure." The hypervisor 404 runs on physical infrastructure 405 (e.g., such as may include, but is not limited to, central processing units (CPUs) and associated memory). The host infrastructure 400 further comprises sets of applications 410-1, 410-2, . . . 410-M running on respective ones of the virtual machines 402-1, 402-2, . . . 402-M under the control of the hypervisor 404. These applications access data stored on NAS system 420. It is to be appreciated that NAS system 420 is configured as described above in the context of FIGS. 1 and 2. Note that the VMs and hypervisor are outlined in FIG. 4 with a dashed box simply to highlight that non-virtual applications may be employed here as well (in which case, the applications would run directly on the physical infrastructure).

Although only a single hypervisor 404 is shown in the example of FIG. 4, a given embodiment of host infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 404 which, as shown in FIG. 4, is directly inserted on top of the computer hardware in order to allocate hardware resources of the physical computer (physical infrastructure 405) dynamically and transparently. The hypervisor 404 affords the ability for multiple operating systems to run concurrently on a single physical computer and share hardware resources with each other.

An example of a commercially available hypervisor platform that may be used to implement portions of the host infrastructure 400 in one or more embodiments of the invention is the VMware vSphere® which may have an associated virtual infrastructure management system such as the VMware vCenter®.

Figure 5:
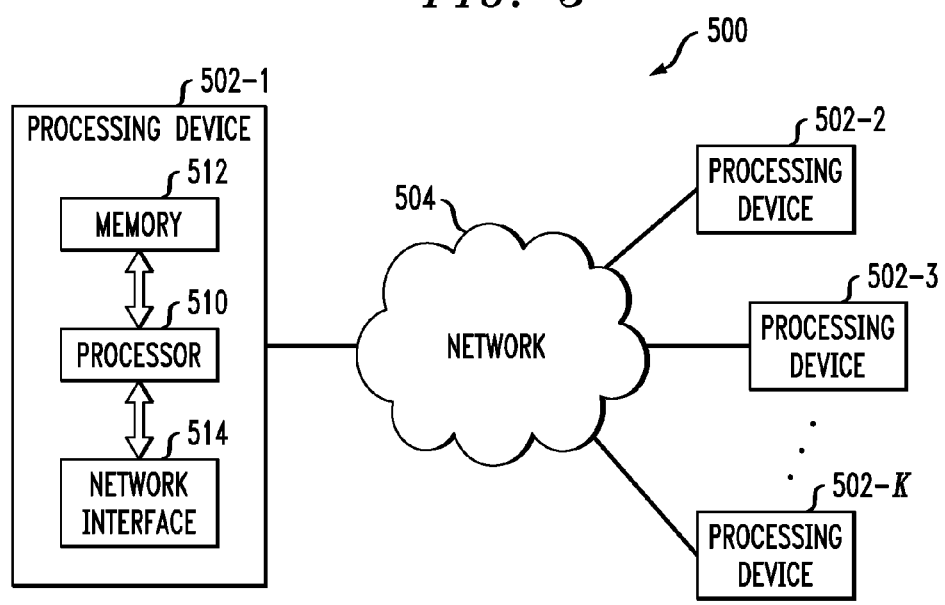
FIG. 5 illustrates a processing platform on which a data center with network attached storage utilizing a native representational state transfer-based application programming interface is implemented according to one or more embodiments of the invention.

FIG. 5 illustrates a processing platform on which a host computing device 401 and an NAS system 420 are implemented according to one or more embodiments of the invention. The processing platform 500 in this embodiment comprises a plurality of processing devices denoted 502-1, 502-2, 502-3, . . . 502-K, which communicate with one another over a network 504. One or more of the elements of system environment 400 may therefore each run on one or more computers or other processing platform elements, each of which may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements.

Components of a computing system as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps described herein. One skilled in the art would be readily able to implement such software given the teachings provided herein. Other examples of processor-readable storage media embodying embodiments of the invention may include, for example, optical or magnetic disks.

Also included in the processing device 502-1 is network interface circuitry 514, which is used to interface the processing device with the network 504 and other system components. Such circuitry may comprise conventional transceivers of a type well known in the art.

The other processing devices 502 of the processing platform 500 are assumed to be configured in a manner similar to that shown for processing device 502-1 in the figure.

The processing platform 500 shown in FIG. 5 may comprise additional known components such as batch processing systems, parallel processing systems, physical machines, virtual machines, virtual switches, storage volumes, logical units, etc. Again, the particular processing platform shown in FIG. 5 is presented by way of example only, and system 100 of FIG. 1 may include additional or alternative processing platforms, as well as numerous distinct processing platforms in any combination.

Also, numerous other arrangements of servers, computers, storage devices or other components are possible. Such components can communicate with other elements of the system over any type of network, such as a wide area network (WAN), a local area network (LAN), a satellite network, a telephone or cable network, a storage network (e.g., FC), a converged network (e.g., FCoE or Infiniband) or various portions or combinations of these and other types of networks.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A data storage system, comprising:
one or more storage nodes configured to attach to a computer network to provide network-attached storage for the computer network;
a first application programming interface providing data storage functionality at a file level in the one or more network-attached storage nodes for a first set of application programs operating in the computer network;
a second application programming interface providing data storage functionality at a level other than the file level in the one or more network-attached storage nodes for a second set of application programs operating in the computer network, wherein the second application programming interface comprises one or more native representational state transfer-based application programming interfaces that export one or more categories of data storage functionalities to enable development of one or more customized application programming interfaces to extend customized data storage functionality in the one or more network-attached storage nodes; and
at least one processing device on which the one or more storage nodes and the first and second application programming interfaces are implemented.

2. The data storage system of claim 1, wherein the data storage functionality at a level other than the file level comprises object level data storage functionality.

3. The data storage system of claim 1, wherein the data storage functionality at a level other than the file level comprises block level data storage functionality.

4. The data storage system of claim 1, wherein the data storage functionality at a level other than the file level comprises Hadoop distributed file system-based data storage functionality.

5. The data storage system of claim 1, wherein the data storage functionality at a level other than the file level comprises data manipulation functionality.

6. The data storage system of claim 5, wherein the data manipulation functionality comprises one or more of a data create function, a data delete function, a data read function, and a data write function.

7. The data storage system of claim 1, wherein the data storage functionality at a level other than the file level comprises data layout functionality.

8. The data storage system of claim 1, wherein the data storage functionality at a level other than the file level comprises cache management functionality.

9. The data storage system of claim 1, wherein the data storage functionality at a level other than the file level comprises system configuration functionality.

10. The data storage system of claim 1, wherein the first set of application programs comprises one or more traditional application programs.

11. The data storage system of claim 1, wherein the second set of application programs comprises one or more next generation application programs.

12. The data storage system of claim 1, wherein the computer network comprises a cloud infrastructure.

13. A method, comprising:
in a data storage system comprising one or more storage nodes configured to attach to a computer network to provide network-attached storage for the computer network;
providing a first application programming interface providing data storage functionality at a file level in the one or more network-attached storage nodes for a first set of application programs operating in the computer network; and
providing a second application programming interface providing data storage functionality at a level other than the file level in the one or more network-attached storage nodes for a second set of application programs operating in the computer network, wherein the second application programming interface comprises one or more native representational state transfer-based application programming interfaces that export one or more categories of data storage functionalities to enable development of one or more customized application programming interfaces to extend customized data storage functionality in the one or more network-attached storage nodes;
wherein the providing steps are implemented via at least one processing device.

14. An article of manufacture comprising a non-transitory processor-readable storage medium having encoded therein executable code of one or more software programs, wherein the one or more software programs when executed by the at least one processing device implement the steps of the method of claim 13.

15. A data center, comprising:
at least one host computing device; and
a data storage system operatively coupled to the host computing device and comprising:
one or more storage nodes configured to attach to the host computing device to provide network-attached storage for the computer network;
a first application programming interface providing data storage functionality at a file level in the one or more network-attached storage nodes for a first set of application programs operating in the host computing device; and
a second application programming interface providing data storage functionality at a level other than the file level in the one or more network-attached storage nodes for a second set of application programs operating in the host computing device, wherein the second application programming interface comprises one or more native representational state transfer-based application programming interfaces that export one or more categories of data storage functionalities to enable development of one or more customized application programming interfaces to extend customized data storage functionality in the one or more network-attached storage nodes.

16. The data center of claim 15, wherein the data storage functionality at a level other than the file level comprises object level data storage functionality.

17. The data center of claim 15, wherein the data storage functionality at a level other than the file level comprises block level data storage functionality.

18. The data center of claim 15, wherein the data storage functionality at a level other than the file level comprises Hadoop distributed file system-based data storage functionality.

19. The data center of claim 15, wherein the first set of application programs comprises one or more traditional application programs.

20. The data center of claim 15, wherein the second set of application programs comprises one or more next generation application programs.

* * * * *